(No Model.)
E. J. M. BECKER.
SAW TOOTH.
No. 341,789. Patented May 11, 1886.
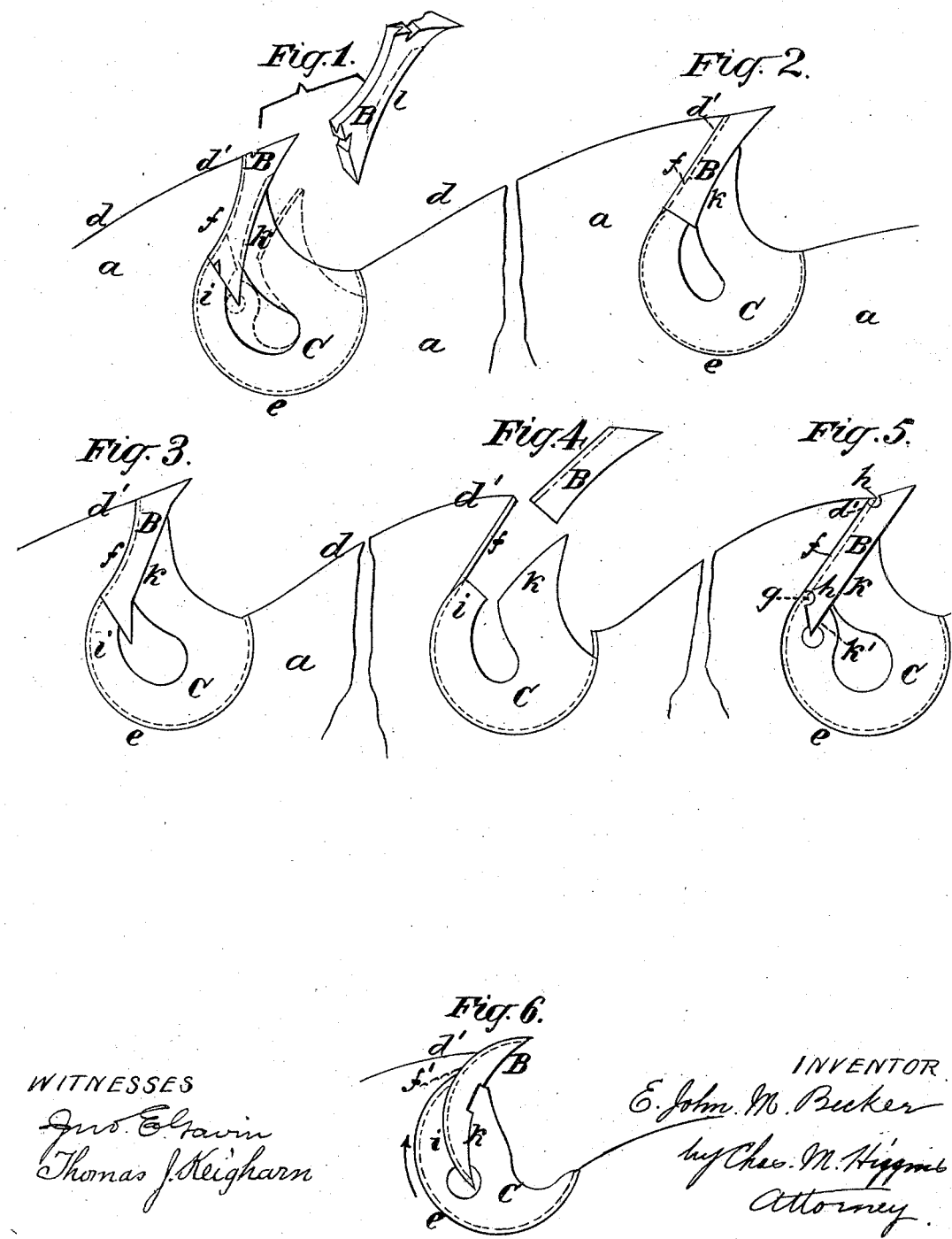

United States Patent Office.

E. JOHN M. BECKER, OF NEW YORK, N. Y.

SAW-TOOTH.

SPECIFICATION forming part of Letters Patent No. 341,789, dated May 11, 1886.

Application filed November 9, 1885. Serial No. 182,240. (No model.)

*To all whom it may concern:*

Be it known that I, E. JOHN M. BECKER, a citizen of the United States, residing at New York city, county and State of New York, have invented certain new and useful Improvements in Insertible Saw-Teeth, of which the following is a specification.

My invention relates to that class of insertible saw-teeth which are composed of a removable tangential bit or cutting-point and a circular holding-shank which fits into a circular socket in the saw and is partially rotated to insert or remove the tooth. The bit or tooth proper, which is the part subject to wear, is made separate from the circular rotating shank of the tooth, so that the bit can be renewed when worn out without needing to renew the entire tooth; but heretofore this bit has been single-acting only, or is pointed only at one end, whereas one prominent feature of my invention is, that I make the bit pointed at each end and reversible, so that it is double-acting, and when worn out on one end can be reversed and its use continued, thus doubling the life of the bits, and obtaining twice the service heretofore possible. It has also been usual heretofore to have the bit made with an angular shoulder to fit against an angular shoulder on the saw-plate at the periphery of the tooth-socket, while the circular rotary shank fits or abuts against the base part only of the bit. In my case, however, I make the bit of the tooth and the tooth-socket without any shoulder, the bearing for the bit being in a continuous line substantially tangential to the circular socket, with the bit fitting bodily against said continuous tangential bearing, while the rotary shank includes more of a circle than usual and takes two abutments on the bit—a circumferential abutment at the base of the bit, as heretofore, and a lateral abutment on the side of the bit opposite the tangential bearing. By this means the construction of the teeth and the tooth-sockets is rendered very simple, and they may be made of smaller size, so as not to weaken the saw-plate so much, and the teeth may be very readily inserted or removed when required, yet cannot be moved accidentally, as the strain or thrust on the bit tends to tighten the tooth more firmly in its socket.

My invention therefore consists, mainly, in the two features above outlined, as hereinafter fully set forth.

In the drawings annexed, Figure 1 presents a section of a saw provided with my improved insertible tooth in its preferred form, showing both features thereof—viz., the double-pointed reversible bit, its tangential bearing, and the doubly-abutting rotary shank. Fig. 2 is a similar view showing a modification which includes the continuous tangential bearing and the doubly-abutting shank, but shows only a single-pointed bit. Fig. 3 shows my preferred device, as in Fig. 1, but having the form of the bit slightly modified. Fig. 4 shows the same tooth as in Fig. 2, but in the removed position, to illustrate the mode of inserting and removing the bits. Figs. 5 and 6 show two modified forms of my invention, including all its features.

In the drawings, $a$ indicates the saw-plate; B, the removable bit or point of the insertible tooth, and C the rotary shank or holder of the tooth. The saw-plate is formed with the usual long notches or gullies, $d$, leading to each inserted tooth, and at the base of this notch is formed the circular socket $e$, into which the notches run, and in which the rotary shank C is socketed firmly and capable of being partially rotated when desired. The bits B project, as usual, at the tip of the gullies or notches $d$, and form the cutting-point of the tooth, as shown.

Referring now to Figs. 1, 2, 3, 4, and 5, it will be seen that the bearing for the bits B on the saw-plate, as shown at $f$, extends in a continuous line from the periphery of the circular socket $e$ to the tip $d'$ of the gully $d$, and that the back of the bearing edge of the bit is formed on a continuous line to correspond, such bearing being substantially tangential to the circular socket and without any angular shoulders, as heretofore. This form of bit-bearing, in being a continuous line and tangent to the circular socket, is easier to form, weakens the saw-blade less, and enables the entire socket and tooth to be made smaller and more compact, which are great advantages. In Figs. 1 and 3 the form of the bit-bearing is that of a curved line, the bearing-face of the bit being concave, while in Figs. 2, 4, and 5 the bearing-faces are in a straight line, as either form of bearing-face may be used, as preferred. In Figs. 1 and 3 the curved form of the bearing-face prevents the bit being thrown out by centrifugal force; but in Fig. 5, where the bearing-face is straight, a projection, $g$, on the rotary shank C, sprung into a recess, $h$, in the bit, prevents the bit from being displaced by centrifugal force.

Now, referring again to Figs. 1, 3, and 5, it will be seen that not only is the bearing of the bit a continuous tangential bearing from socket to tip, but the bit is pointed at each end, and may be reversed end for end, so that when one point is worn out it can be reversed and inserted in an inverted position and used again, thus doubling the service of the bit. It will be further seen that the rotary shank or holder C includes nearly a whole circle, and takes two bearings or abutments against the bit—viz., one bearing, $i$, at the base of the bit, in about the usual way, and a second bearing, $k$, on the front side of the bit, in an unusual or novel way. The bearing $i$, I term a "circumferential base" bearing or abutment, as it bears upon the base of the bit in the direction of the circumference of the circular socket $e$ and rotary shank C, while the upper bearing, $k$, I term a "lateral" abutment, as it bears on the side of the bit in a direction crosswise of the bit and shank. The mode of inserting and removing the teeth will, therefore, be now readily understood by referring to Fig. 1—that is, by partly turning the shank C in its socket by means of a suitable wrench, as indicated by dotted lines, the base abutment $i$ will rise in the socket and force out the bit B, while the lateral abutment $k$ will retire from the bit and allow the same to be freely removed, as shown in the detached view, Fig. 1. By reversing this action the bit will be readily inserted, as will be understood from Figs. 1, 3, and 5, and it will be seen that when the shank C is turned backward tightly the abutment $k$ will press firmly against the front of the bit and hold it snugly against its bearing $f$. It may now be further seen that when the saw is in action the cutting thrust or strain on the bit in acting tangentially will tend to revolve the shank in its socket; but this tendency will react at the abutment $k$, to force the bit still firmer against its bearing $f$, so that the cutting strain on the bit only acts to further tighten the tooth in its socket, which is an important advantage of this construction. The lateral strain on the bit will tend to swing it as a lever on the fulcrum $d'$, and thus force the bit against the abutment $k$, which strain is, however, fully resisted by the ample strength of the shank and the friction of its bearing-surfaces. In Fig. 5 the supplementary abutment $k'$, bearing against the base of the bit, will further re-enforce it against said strain.

The circular sockets $e$ are, of course, made with V-shaped edges, to match with a V-groove on the periphery of the rotary shanks in the usual way. The bit-bearings $f$ are also made with a V-edge, continuous with that of the socket, as indicated in Figs. 1, 2, 3, 4, and 5, and the bearing-edge of the bit is recessed with a V-groove to match therewith, as best seen Fig. 1. The front edge of the bit B may have a slight recess, $l$, as shown by dotted lines in Fig. 1, into which the abutment $k$ of the rotary shank will fit, as seen in Fig. 1, so as to more firmly secure the bit in place and better resist the centrifugal strain on the bit.

In Fig. 3 the construction is the same as in Fig. 1, except that the front edge of the bit is a flat or straight line, instead of concave, as in Fig. 1, and the abutment $k$ of the shank fits directly against the straight face, instead of into a recess, as in Fig. 1.

In Figs. 2 and 4 the bit is shown as single-pointed, as heretofore; but the construction of the socket, bearing, and rotary shank is substantially the same as in Figs. 1 and 2.

In Fig. 6 the bit is double-pointed, as in my preferred device, but is made in the form of an arc of a circle cut by a chord, and recessed in the center of the chord and sprung into a notch in the rotary shank C, which notch corresponds to the form of the bit and holds the same firmly in place, as shown. The curve or circle of the socket $e$ and of the rotary shank C intersects the curve of the bit near the tip of the saw-plate, forming a short bearing, $f'$, against which the bit abuts. The cutting thrust or strain tends to force the bit directly against the bearing $f'$, and also tends to swing it like a lever against the abutment $k'$, both of which strains, as may be seen, will be firmly resisted.

To remove the bit the shank is freely rotated in the direction of the arrow, and the bit may then be sprung out sidewise and reversed and sprung into place again, after which the shank is revolved back to insert the tooth in place, as seen in Fig. 6.

What I claim is—

1. In insertible-toothed saws, the combination, with the saw-plate having tooth-sockets and removable holding-shanks fitting said sockets, of double-pointed reversible bits inserted radially, or nearly so, in the sockets between the saw-plate and the holding-shanks, with one point directed idly inward and the other point directed actively outward, substantially as herein set forth.

2. In insertible-toothed saws, the combination, with circular sockets in the saw-plate, of double-pointed reversible bits inserted tangentially to said sockets and secured by circular rotary shanks fitting said sockets, substantially as set forth.

3. In combination with a saw-plate having circular sockets $e$ without angles or shoulders, a bit inserted tangentially, or nearly so, to said socket, and abutting laterally against the saw-plate, but free tangentially, with a rotary circular shank, C, fitting said socket, and having two bearings, $i\,k$, against said bit, the bearing $i$ receiving the direct tangential thrust of the bit, while the bearing $k$ has a lateral reaction on the bit, due to the tangential cutting thrust thereon, substantially as herein shown and described.

4. In combination with the saw-plate having circular sockets $e$, the double-pointed bits B, inserted tangentially to said sockets and abutting against the saw-plate, and the rotary circular shanks C, having the circumferential and lateral abutments $i$ $k$ against said bits, substantially as shown and described.

E. JOHN M. BECKER.

Witnesses:
 CHAS. M. HIGGINS,
 ROBERT M. CURTIN.